Feb. 12, 1929.

E. V. McMURRAY 1,701,786

PIPE TAP

Filed Feb. 9, 1926

Inventor
Eugene V. Mc. Murray
By Lancaster and Allwine
Attorneys

Patented Feb. 12, 1929.

1,701,786

UNITED STATES PATENT OFFICE.

EUGENE V. McMURRAY, OF TAFT, CALIFORNIA.

PIPE TAP.

Application filed February 9, 1926. Serial No. 87,107.

My invention relates to improvements in pipe taps for use in tapping water mains, gas mains or the like.

The primary purpose of the invention is to provide a simple practical pipe tap which is better adapted for connecting standard makes of tapping machines to water or gas mains than other pipe taps now in use.

To the accomplishment of this and certain subordinate objects, presently apparent, there has been illustrated in the accompanying drawings a preferred form of pipe tap constructed according to my invention and presently described in detail.

In said drawings:—

Figures 1, 2, 3, 4:
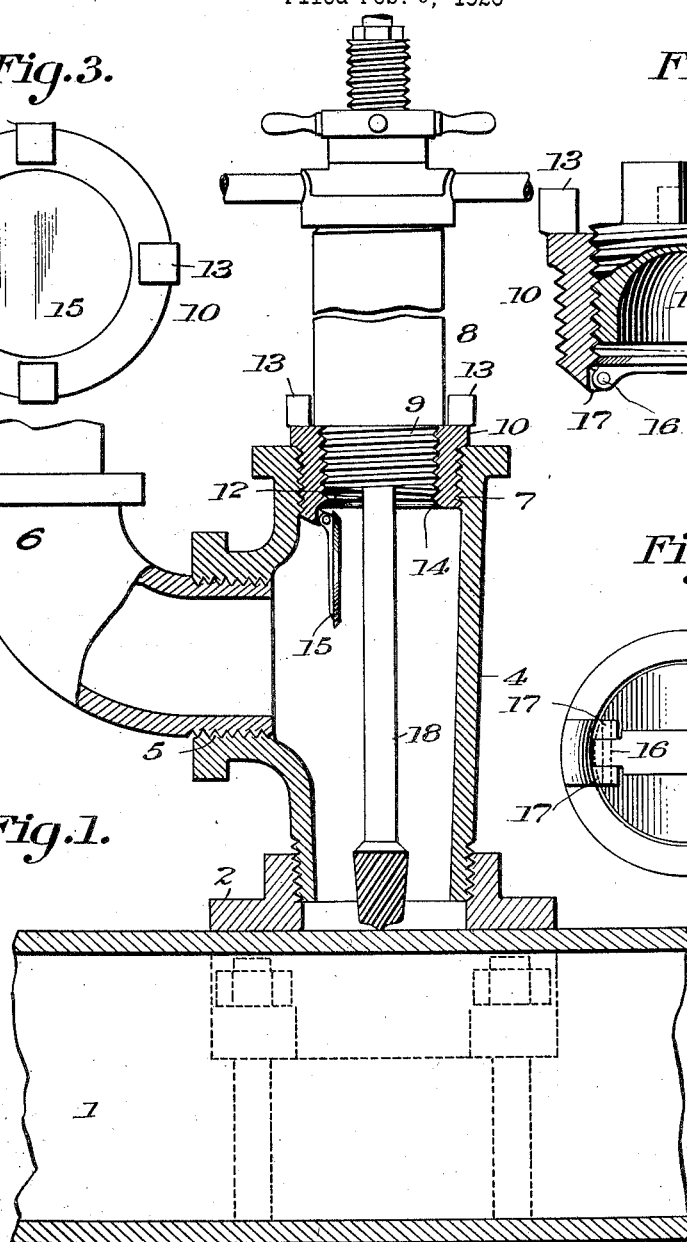
Figure 1 is a sectional view, partly in elevation illustrating the application and use of my invention in tapping a main.
Figure 2 is a transverse sectional view, partly in elevation illustrating the use of my invention after the tapping operation has been completed.
Figure 3 is a top plan view of a coupling sleeve and valve forming a part of my invention.
Figure 4 is a bottom plan view of the same.

In the illustrated embodiment of my invention the numeral 1 designates a main pipe, and 2 a saddle member which is clamped in desired position upon the main pipe 1 by yoke members 3. The saddle member 2 has a screw threaded bore for receiving one threaded end of an open ended branch pipe coupling 4 and securing it to the pipe 1 in a substantially upright position. The branch pipe coupling 4 has the usual side outlet 5 for the attachment of a branch pipe 6.

As is well known in the art it is the usual practice to insert the drill part of a tapping machine into the open end of the coupling to drill a communicating opening in the pipe 1 and afterwards to close the open end of the coupling by screwing a plug therein and for this purpose the other or free end of the coupling is internally threaded as shown at 7. One form of these machines for instance that illustrated in a general way at 8 is provided with a casing that is threaded at its lower end as shown at 9 so that it can be attached to a branch pipe coupling for use in the manner outlined.

According to my invention there is provided either a coupling of greater diameter than that of threaded end of the casing of the tapping machine or one having a larger free end as desired. For securing the tapping machine 8 to the coupling 4 there is provided a sleeve member 10 externally threaded as shown at 11 to screw into the threaded free end of the coupling 4 and internally threaded to receive the smaller threaded end 9 of the machine 8. The top of the sleeve 10 has arising therefrom wrench lugs suitably spaced from the center of the sleeve 10 to receive the casing of the machine therebetween. The lower end of the sleeve 10 is constructed to form a beveled valve seat 14 for seating a flap valve 15 suitably secured as by a pivot pin 16 to lugs 17 depending from the sleeve 10. Normally this valve 15 is held open by the action of gravity but when the tapping machine 8 and drill 18 are withdrawn the pressure of the fluid which has been admitted to the coupling 4 through the communication established, seats the valve as will be understood. The sleeve 10 and hence the coupling 4 may then be sealed by an externally threaded plug such as that designated by 19 adapted to screw into the sleeve 10.

In order that the wall of the sleeve member may be made relatively thin, so that the bore of the sleeve will be of maximum diameter to receive conventional tapping machines, and yet permit the valve 16 to swing to a plane at right angles to the plane of its seat and parallel to the axis of the tapping machine, the lugs 17 extend inwardly past the circumferential plane of the sleeve bore, and the pivot pin 16 is carried by the valve 15 inwardly of the circumferential plane of its periphery, as clearly shown in Figures 2 and 4. This arrangement permits the valve 15 to swing to a full open position without engaging the wall forming the upright way thru the coupling 4 as shown in Figure 1, and it is not necessary to use this sleeve member with a coupling 4 having an enlarged chamber to accommodate the valve 15, when open, since the valve when open is wholly within the circumferential plane of the external screw threaded periphery of the sleeve member.

It is believed that the operation and advantages of my invention will be understood from the foregoing, but it is to be understood that the right is reserved to such changes and modifications of the herein described embodiment thereof as fall within the scope of the protection prayed.

I claim:

A pipe tap comprising in combination, a branch pipe coupling having an internally threaded open ended way, an externally and internally threaded coupling sleeve threaded into said way of the branch pipe coupling for threaded reception of an externally threaded casing of a tapping machine, said sleeve having a valve seat at its inner end and a pair of lugs projecting inwardly toward the axis of the sleeve from the lower portion of the sleeve, and a disc flap valve for said seat, pivotally connected to said lugs, with its pivot within the circumferential plane of the internally threaded bore of the sleeve and within the circumference of the valve, whereby the valve may swing to an open position in a plane at a right angle to the plane of its seat out of engagement with the said way of the branch pipe coupling.

EUGENE V. McMURRAY.